No. 734,109. Patented July 21, 1903.

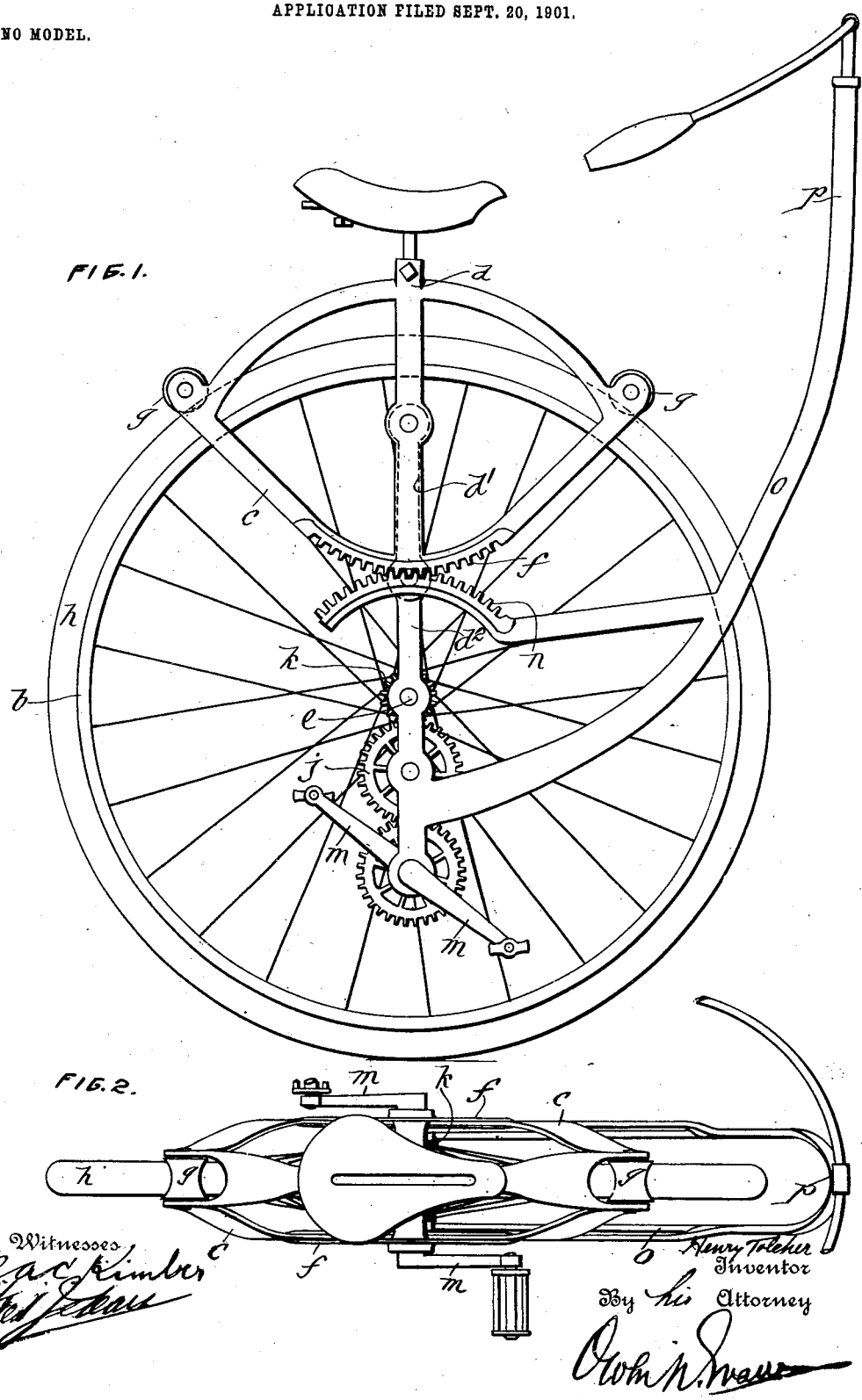

UNITED STATES PATENT OFFICE.

HENRY TOLCHER, OF BANFF, ALBERTA, CANADA.

MONOCYCLE.

SPECIFICATION forming part of Letters Patent No. 734,109, dated July 21, 1903.

Application filed September 20, 1901. Serial No. 75,859. (No model.)

*To all whom it may concern:*

Be it known that I, HENRY TOLCHER, of Banff, Alberta, North-West Territories, Dominion of Canada, have invented certain new and useful Improvements in Monocycles; and I do hereby declare that the following is a full, clear, and exact description of the same.

My invention has for its object to provide an equilibrant whereby the rider of a monocycle can more readily maintain his balance whether traveling along the flat or ascending or descending an incline.

The invention may be said, briefly, to consist in providing a connection between the seat and handles whereby the weight of the rider can at will be moved forward or backward of the center of the wheel or directly above it to maintain or regain his equilibrium.

More specifically speaking, the invention consists of a swinging-seat-supporting frame in operative connection with a swinging handle-bar the movement whereof by the rider when upon the seat toward and from him will move the seat toward and from the front of the wheel.

For full comprehension, however, of my invention reference must be had to the accompanying drawings, forming a part of this specification, in which like symbols indicate the same parts, and wherein—

Figure 1 is a side elevation of a monocycle constructed according to my invention, and Fig. 2 is a plan view thereof.

The wheel $b$ is of ordinary construction and is mounted between a pair of quadrantal frames $c$, connected rigidly together at their upper ends by a seat-supporting portion $d$, while they are fulcrumed near their lower ends upon the upper end of a pair of bars $d'$, fulcrumed in turn upon the upper end of a pair of lever-bars $d^2$, these latter being fulcrumed upon the axle $e$ of the wheel. The lower edges of these quadrantal frames are in the form of gears $f$. A pair of rollers $g$ are carried by the seat-supporting portion $d$, each adjacent to one end thereof and in bearing relation with the tire $h$ of the wheel.

Intermeshing driving-gears $j$ are carried upon the portion of each bar $d^2$ below the center of the wheel and are operatively connected to a pair of gears $k$ upon the wheel-hub, at each side thereof, a pair of cranks $m$ being operatively connected to the lowermost gears.

A pair of curved toothed racks $n$ are formed integral with a forked handle-frame $o$, upon the upper end of which the handle-bar $p$ is rigidly mounted, these curved racks intermeshing with the before-mentioned quadrantal gears $f$ upon the seat-frame, and the whole providing a novel and efficient equilibrant for monocycles.

The operation of my improved equilibrant is as follows: When the rider is traveling along a level road or climbing a hill, it is necessary that he dispose his weight in advance of the vertical, and to that end he draws upon the handle, thereby causing the intermeshing racks and gears to swing the seat, with the rider thereon, forward, which will also be necessary when the speed is being increased on a level, and a reverse action will swing the seat rearward to properly balance the rider when descending an incline or decreasing his speed.

It is obvious that the frames of my improved equilibrant may be changed in form and their precise arrangement varied without departing from the spirit of my invention.

What I claim is as follows:

1. The combination with a wheel, and means for propelling same, of an equilibrant comprising a swinging-seat-supporting frame having a quadrantal gear integral therewith; a handle-frame having a curved toothed rack integral therewith and intermeshing with said quadrantal gear whereby said seat can be oscillated to different angular positions relatively to the surface being traversed.

2. A monocycle consisting of a wheel; a pair of lever-bars fulcrumed to said wheel one at each side thereof; a pair of links pivotally connected at their lower ends to the upper ends of said lever-bars; an oscillatory forked frame straddling said wheel and pivoted to the upper ends of said links; a seat mounted upon the upper end of said oscillatory frame; a quadrantal gear integral with said seat-supporting frame; a pivoted handle-frame integral with the lower portion of said lever-bars and pivoted to the wheel; a handle mounted upon said handle-frame; a rack integral with said handle-frame and intermeshing with said quadrantal gear; driving-gears carried by said lever-bars and operatively connected to the wheel; and a crank carried by each lever-bar and operatively connected to said driving-gears substantially as described and for the purpose set forth.

3. The combination with a wheel, and means for propelling same, of an equilibrant comprising a swinging-seat-supporting frame having a quadrantal gear integral therewith; means for supporting said frame; a handle-frame having a rack integral therewith and intermeshing with said quadrantal gear whereby said seat can be oscillated to different angular positions relatively to the surface being traversed.

In testimony whereof I have affixed my signature in presence of two witnesses.

HENRY TOLCHER.

Witnesses:
G. M. FEAR,
A. N. SADDINGTON.